(12) United States Patent
Tuunanen et al.

(10) Patent No.: US 6,463,140 B2
(45) Date of Patent: Oct. 8, 2002

(54) EXECUTION OF SERVICES IN INTELLIGENT NETWORK

(75) Inventors: Heikki Tuunanen, Espoo; Keijo Palviainen, Helsinki, both of (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/793,673

(22) Filed: Feb. 26, 2001

(65) Prior Publication Data

US 2001/0019606 A1 Sep. 6, 2001

Related U.S. Application Data

(63) Continuation of application No. PCT/FI99/00736, filed on Sep. 10, 1999.

(30) Foreign Application Priority Data

Sep. 11, 1998 (FI) .................................................. 981960

(51) Int. Cl.[7] .......................... H04M 3/42; H04M 7/00; G06F 17/30
(52) U.S. Cl. ........................ 379/201.02; 379/207.02; 379/221.09; 379/221.12; 379/201.05; 707/10
(58) Field of Search ................ 379/201.02, 201.05, 379/207.02, 221.08, 221.09, 221.1, 221.11, 221.12, 269, 279; 707/1, 10; 709/223, 224, 227

(56) References Cited

U.S. PATENT DOCUMENTS

| | | | |
|---|---|---|---|
| 5,526,413 A | 6/1996 | Cheston, III et al. | 379/221.09 X |
| 5,701,412 A | 12/1997 | Takeda et al. | 379/201.03 |
| 5,999,610 A * | 12/1999 | Lin et al. | 370/259 |
| 6,098,094 A * | 8/2000 | Barnhouse et al. | 709/203 |
| 6,169,794 B1 * | 1/2001 | Oshimi et al. | 379/201.01 |
| 6,282,280 B1 * | 8/2001 | Rekieta et al. | 379/207.02 |

FOREIGN PATENT DOCUMENTS

| | | |
|---|---|---|
| EP | 0454332 A2 | 10/1991 |
| EP | 0667722 A1 | 8/1995 |
| EP | 0830039 A1 | 3/1998 |

OTHER PUBLICATIONS

Takeshi Sugiyama, Kazunori Ishikawa, and Hiroshi Itoh, "A Service Program Structure of UPT Service in Intelligent Networks", IEEE Conference, 1993, pp. 870–874.

International Search Report for PCT/FI99/00736.

Hiroshi Sakai, Kazumasa Takami and Yoshibiro Niitsu; "A Service Logic Program Generation Method for Advanced Intelligent Network".

* cited by examiner

Primary Examiner—Harry S. Hong
(74) Attorney, Agent, or Firm—Altera Law Group, LLC

(57) ABSTRACT

The invention is based on the idea that in an intelligent network the order of execution of service programs at one point during the call, such as the detection point, is defined, and the service programs are contacted in this order until instructions are received to leave the point or release the call. The order of execution is defined by dealing with one category of service-related detection points after another, and within each category with a control relationship the order of execution is defined by a priority set for service programs.

11 Claims, 4 Drawing Sheets

EXECUTION OF SERVICES IN INTELLIGENT NETWORK

This application is a continuation of international application Ser. No. PCT/FI99/00736, filed Sep. 10 1999.

FIELD OF THE INVENTION

The invention relates to execution of services in an intelligent network.

BACKGROUND OF THE INVENTION

The rapid development of the telecommunication field has made it possible for operators to provide users with services of many different types. One such network architecture providing advanced services is called the Intelligent Network, for which the abbreviation IN is generally used. Examples of such services are the Virtual Private Network VPN, which allows the use of short numbers between subscribers of the private network, and the Personal Number, where the intelligent network re-routes calls made to the personal number in a manner controlled by the subscriber. IN-services are utilized by various networks, such as mobile communications networks and fixed networks connected to IN.

The physical architecture of the intelligent network is illustrated in FIG. 1, where the physical entities are shown as rectangles or cylinders and the functional entities located in them are shown as ovals. This architecture is described briefly below, since references will be made to an intelligent network environment in the description of the invention to follow. An interested reader may acquire a more detailed understanding of the intelligent network from ITU-T recommendations Q.121X or from Bellcore's AIN recommendations, for example. ETS 300 374-1 CorelNAP terms will be used in the description of the invention and of its background, but the invention can also be used in intelligent networks implemented in accordance with other intelligent network standards.

The Subscriber Equipment SE, which may be a telephone, a mobile station, a computer, or a fax, for example, is either connected directly to a Service Switching Point SSP or to a Network Access Point NAP. A service switching point SSP provides the user with access to the network and attends to all necessary dialing functions. The SSP is also able to detect the need for an intelligent network service request. In functional terms, the SSP includes call management, routing, and service dialing functions.

The Service Control Point SCP includes Service Logic Programs SLP, which are used to produce intelligent network services. In the following, "service program" will also be used as a shorter form for "service logic programs".

The Service Data Point SDP is a database containing such data about the subscriber and the intelligent network which the SCP service programs use for producing individualized services. The SCP may use SDP services directly by way of a signaling or data network.

The Intelligent Peripheral IP provides special functions, such as announcements, and voice and multiple dialing identification.

The signaling network shown in the figure is a network according to Signalling System Number 7 (SS7), a known signaling system described in the Specifications of Signalling System No. 7 of the CCITT (nowadays ITU-T), Melbourne 1988.

The Call Control Agent Function (CCAF) ensures that the end user (subscriber) has access to the network. Access to IN-services is implemented through additions made to existing digital exchanges. This is done by using the Basic Call State Model BCSM, which describes the various stages of call handling and includes those points or Detection Points DP where the call handling can be interrupted in order to start intelligent network services. At these detection points, the service logic entities of the intelligent network may be in an interaction relation with the basic call and connection management function. In the exchange, the call set-up is divided into two parts: the call set-up in the originating half and the call set-up in the terminating half. As a rough description, call handling in the originating half is related to the services of the calling subscriber, while call handling in the terminating half is related to the services of the called subscriber. The corresponding state models are the Originating Basic Call State Model (O-BCSM) and the Terminating Basic Call State Model (T-BCSM). The BCSM is a high-level state automaton description of those Call Control Functions (CCF) needed for setting up and maintaining a connection between the users. Functionality is added to this state model with the aid of the Service Switching Function (SSF) (cf. partial overlapping of CCFs and SSFs in FIG. 1) to make it possible to decide when intelligent network services (i.e. IN-services) should be requested. When IN-services have been requested, the Service Control Function (SCF), including the service logic of the intelligent network, attends to the service-related processing (in call establishment). Thus, the Service Switching Function SSF connects the Call Control Function CCF to the Service Control Function SCF and allows the Service Control Function SCF to control the Call Control Function CCF.

The intelligent network service is implemented in such a way that in connection with the encounter of service-related detection points the Service Switching Point SSP asks the Service Control Point SCP for instructions with the aid of messages relayed over the SSP/SCP interface. In intelligent network terminology these messages are called operations. The SCF may request, for example, that the SSF/CCF perform certain call or connection functions, such as charging or routing actions. The SCF may also send requests to the Service Data Function (SDF), which provides access to service-related data and network data of the intelligent network. Thus the SCF may request, for example, that the SDF fetches data concerning a certain service or that it updates this data.

The above functions involved in interaction with the subscriber are supplemented by a Specialised Resources Function SRF providing an interface for those network mechanisms. Examples are messages to the subscriber and the collection of the subscriber's dialing.

The following is a brief description of the role of the functional entities shown in FIG. 1 in terms of IN-services. The CCAF receives the service request made by the calling party, which is typically made by the calling party lifting the receiver and/or dialing a certain number series. The CCAF relays the service request further to the CCF/SSF for processing. The CCF has no service data, but it is programmed to identify those detection points where a SCP visit might be made. The CCF interrupts the call set-up for a moment and gives the service switching function SSF data about the detection point encountered (about the stage of call set-up). It is the duty of the SSF through use of predetermined criteria to interpret whether the task is a service request related to intelligent network services. If this is the case, the SSF sends to the SCF a standardized IN-service request, including data related to the call. The SCF receives the request and decodes it. Then it works together with the SSF/CCF, SRF, and SDF in order to produce the requested service for the end user.

As was presented above, service is started when the SSF sends to the SCF a standard IN-service request. The service request may be sent during certain stages of the call. FIG. 2 illustrates a few basic operations of a state-of-the-art function of an intelligent network at detection points. At point 21 the SSP sends to the SCP an InitialDP service request, including basic data on the call for starting the intelligent network service. Thereupon the arming of detection points in the SSP follows. At point 22 the SCP sends to the SSP a RequestReportBCSMEvent operation telling the SSP which detection points it should report to the SCP. Next, at point 23, the SCP typically sends charging and/or interaction operations, such as ApplyCharging (e.g. a request for a charging report) or PlayAnnouncement (give an announcement to the subscriber). At point 24 the SCP sends to the SSP a routing instruction, such as Connect (route the call to a new number) or Continue (continue the call set-up with the same data). When it meets the detection point reserved by the SCP, the SSP sends to the SCP an EventReportBCSM operation at point 26.

Detection points determined in intelligent network architecture are the primary mechanism for reporting various events. The events 21–24 in FIG. 2 described above relate to a detection point called the Trigger Detection Point (TDP). The SSP may make an initial inquiry concerning a service to the SCP in connection with a TDP service-related detection point. Therefore, a new IN-service is initiated in connection with the TDP. At so-called Trigger Detection Point—Request (TDP-R), the processing of the call is stopped until the SSP receives instructions from the SCP. Thus, a control relationship is formed between the SSP and the service program in question. At the Trigger Detection Point—Notification (TDP-N), only notification on encounter of the service-related detection point is sent from the SSP to the SCP and call handling is continued without waiting for instructions. The triggering information relating to different IN-services is stored in the network. For TDP-R detection points the triggering information may include the defining of priority as to which of the more than one service programs is to be initiated if there are several service programs to fulfill their triggering information at the same detection point. When only one control relationship is allowed, the service program with the highest priority is initiated from among the triggered service programs and all others are abandoned at that detection point.

Another type of detection point is the Event Detection Point (EDP). Point 26 in FIG. 2 shows a moment when in the course of a call an EDP detection point is encountered. The SSP reports on the encounter with this service-related detection point to the SCP, which at point 28 sends additional call instructions to the SSP. The Event Detection Point -Request (EDP-R) is a detection point where the processing of the call will stop at the connection point until the SCP sends additional instructions. The arming of the EDP-R detection points creates a control relationship between the SSP and a particular service program of the SCP. By control relationship is meant that a session is going on between the call set-up half and the SCF, and the SCF may during this session give instructions that change the handling of the call. In a monitor relationship the SCP is not able to affect the progress of the call handling; it can only ask the SSP to report on various events relating to the call. In a monitor relationship, the Event Detection Point—Notification (EDP-N) may be armed.

According to the IN-standard the monitoring service programs are handled at a detection point before the controlling service programs and the service programs already started are handled before the new service programs. Therefore, the execution order of different categories of service-related detection points in IN-network is the following: EDP-N, TDP-N, EDP-R, and TDP-R.

In accordance with the current intelligent network standard, only one control relationship but several monitor relationships can relate to a call. Thus a problem with EDP-R is that it prevents the production of any additional services. This is especially problematic when one service program reserves a control relationship for the whole duration of the call by arming a detection point to be met at the end of the call as an EDP-R, whereby no more intelligent network services can be started during the call in question. The operation of an intelligent network is thus based on the fact that only one service program (SCP relationship) at a time can have a control relationship and can thus control the SSP. This principle is commonly referred to as a single point of control.

If it were possible to establish multi-point control, where several control relationships are allowed simultaneously, the execution order of the service programs would be a problem. In a notification type of service-related detection point, such as EDP-N or TDP-N, the execution order of notification to different services is not so essential since notification does not affect the processing of the call. But when requesting call handling instructions as in TDP-R or EDP-R, the outcome of the process is different depending on the execution order of the different service requests. For example, the calling name service has to be initiated before the virtual private network service to allow retrieval of the calling name.

BRIEF SUMMARY OF THE INVENTION

It is the purpose of this invention to control the execution of multiple service programs in an intelligent network.

This purpose is achieved through a method and a switching point according to the invention which are characterized by the independent claims. Different embodiments of the invention are presented in the dependent claims.

The invention is based on the idea that the order of execution of service programs at one point during the call, such as the detection point, is defined, and the service programs are contacted in this order until instructions are received to leave the point or release the call. The order of execution is defined by dealing with one category of service-related detection points after another, and within each category with a control relationship the order of execution is defined by a priority set for service programs.

The execution of services according to the invention has the advantage that it provides a controlled means of executing multiple service programs.

Another advantage of the method according to the invention is that it makes possible diversified service combinations.

A further advantage of the method according to the invention is that service programs can be distributed freely without harming the combined functionality.

LIST OF FIGURES

The invention will now be described more closely in connection with preferable embodiments with reference to the examples shown in FIGS. 3, 4, 5*a*, and 5*b* in the appended drawings, wherein.

BRIEF DESCRIPTION OF THE INVENTION

Figure 1:
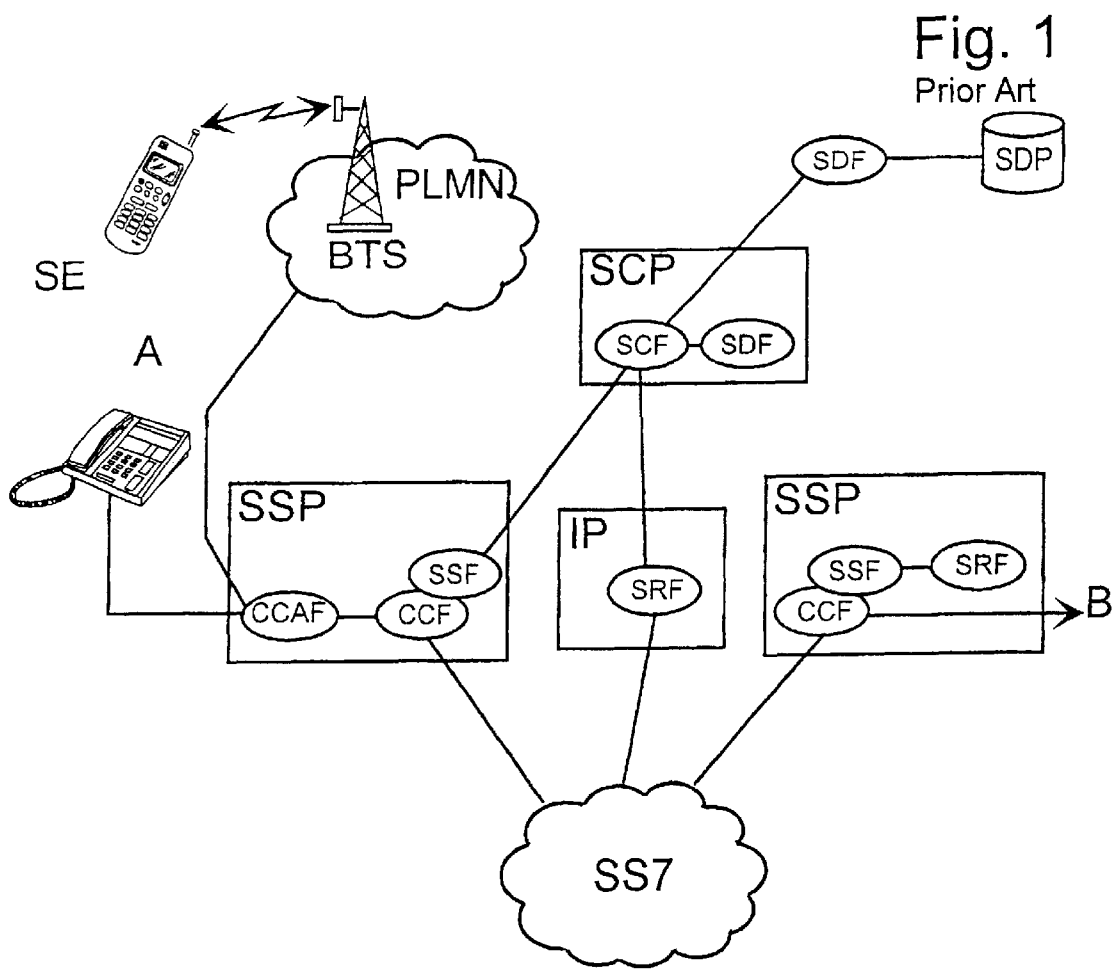
FIG. 1 shows parts of an intelligent network structure which are essential to the invention.
Figure 2:
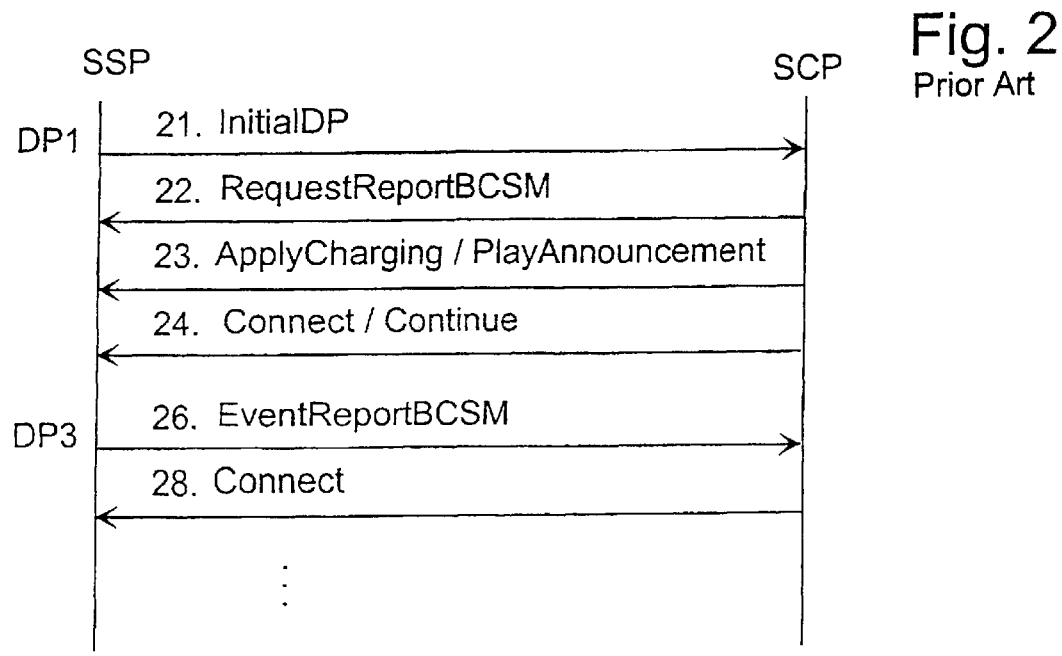
FIG. 2 shows the operation of a state-of-the-art intelligent network at detection points in the light of a few basic operations.
Figure 3:
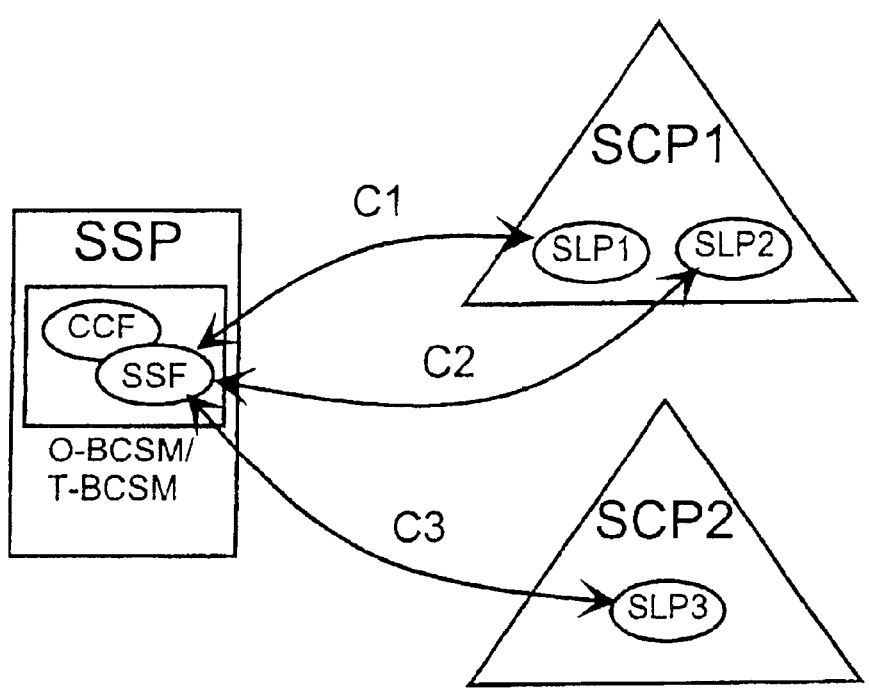
FIG. 3 shows an intelligent network structure where multi-point of control relationships are shown.

The method according to the invention is independent on the way the multi-point of control is implemented. One way of implementing several simultaneous control relationships is such that the controllability of a connection is divided into parts by grading different degrees of controllability, so-called controllability classes, within each of which a single point of control is preferably used. The controllability class defines a certain set of such instructions provided by the service program which are acceptable to the switching point in this controllability class. The controllability of connections is thus based on sub-functionality. The simultaneous controllability of several service programs is thus made possible, that is, permission to provide the switching point with instructions for handling of the call can be given to several service programs to be carried out simultaneously, provided that the instructions belong to different controllability classes. Service programs pertaining to different controllability classes can thus simultaneously control the operation of the switching point by means determined by their respective controllability class as can be seen in FIG. 3. Free controllability classes are allocated to service programs according to their controllability requirement. The division of controllability is within the state model (O-BCSM or T-BCSM). The allocation of a controllability class in one BCSM of the call may also affect other BCSMs of the call, e.g. prevent services requiring the same controllability class from starting. Another way to provide multi-point control is to transfer the control from one service program to another within one detection point.

Figure 4:
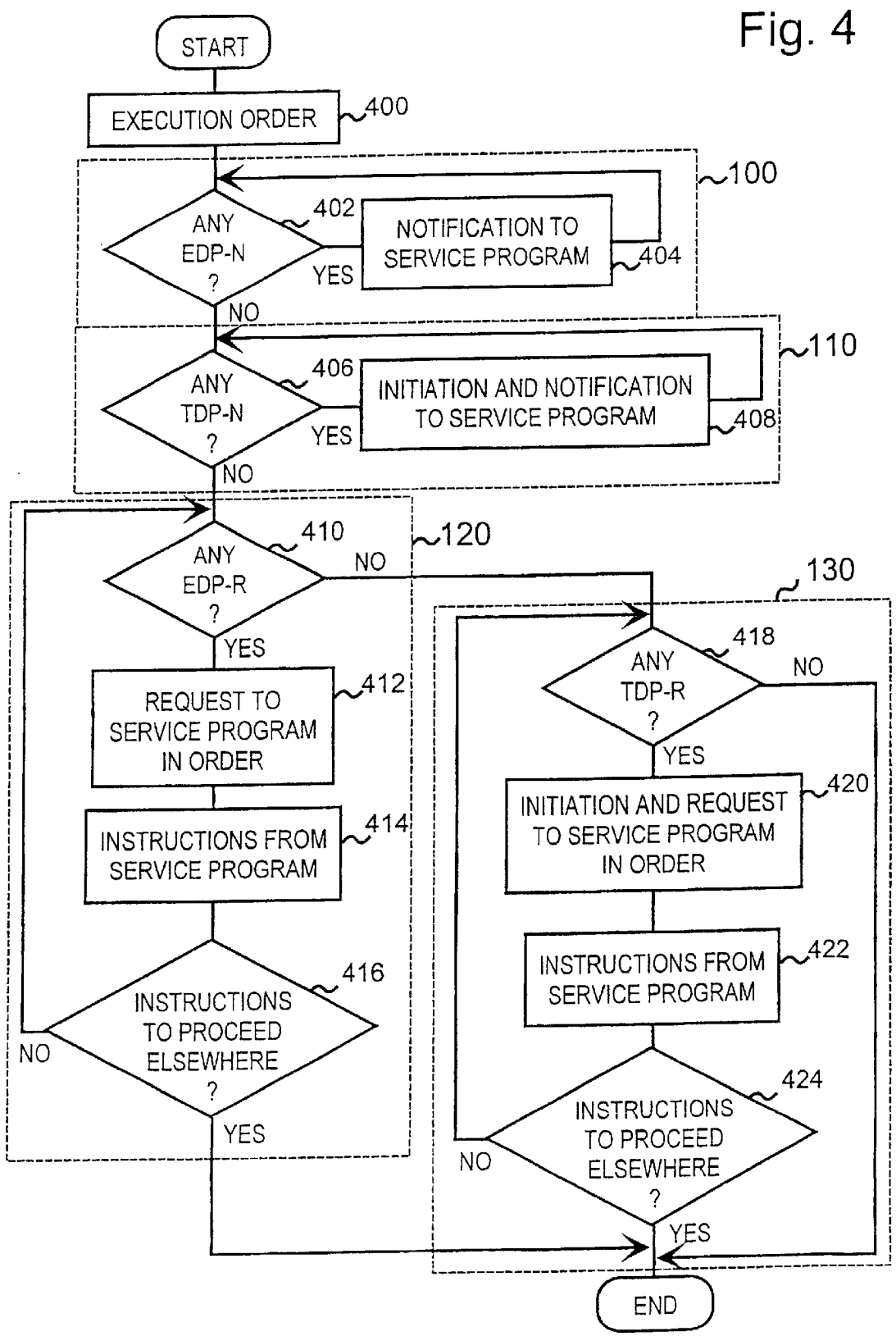
FIG. 4 shows the first embodiment of the invention as a flow chart.

FIG. 4 shows the first embodiment of the method according to the invention as a flow chart. First, the execution order is set for the service programs (stage 400). It is advantageous to set a new priority parameter in the IN-service information to be used, at least at the encounter of the EDP-Rs. Also the prior-art priority in the IN-service trigger information can be used in the method according to the invention, especially at the encounter of the TDP-Rs. The execution order need not to be defined at each detection point separately. The rest of the flow chart in FIG. 4 relates to one detection point or another fixed point in a call. The EDP-N contacts are first checked at stage 402. If there is at least one EDP-N to be carried out, notification is given to the service program in question (stage 404). The execution order between different service programs contacted in the EDP-N category is not relevant as they do not affect each other, and therefore, these contacts can be made in any order within this EDP-N category. The EDP-N execution 100 is continued until all these contacts are handled. Next, TDP-N contacts are checked at stage 406. According to prior art, the triggering conditions are evaluated for the TDP-N related service programs. If there is at least one triggered TDP-N to be carried out, the service program in question is initiated and notification is given to it (stage 408). As with the EDP-N contacts, the order of execution among different service programs contacted in the TDP-N category is not relevant. Therefore, these contacts can be made in any order within this TDP-N category. The TDP-N execution 110 is continued until all triggered contacts are handled. After that, the EDP-R execution 120 is carried out. Different service programs are handled in the order defined by some priority parameter, advantageously the new priority parameter according to the invention. At stage 410 EDP-R contacts are checked. If there are EDP-R contacts to be handled, at stage 412 a request is sent to the service program with the highest priority. The call handling is stopped until instructions are received from this service program at stage 414. The instructions are evaluated as to whether they direct that the call proceed to some other destination, such as to another telephone number, or require the call to be released (stage 416). In all such cases, the handling of the call at the detection point is ended and the remaining EDP-Rs are not handled. In all other cases execution of the EDP-R is continued from stage 410 in the order according to the invention. Finally, when all EDP-R contacts have been carried out and the call is still at the same detection point, the TDP-R execution 130 is entered. At stage 418 TDP-R contacts are checked. According to prior art, the triggering conditions are evaluated for TDP-R related service programs. According to the invention, triggered service programs are handled in the order defined by some priority parameter, such as the prior-art priority in the IN-service triggering information or the new priority parameter according to the invention, so that the service program with the highest priority is handled first, after that the service program with the next highest priority, and so on. If there is at least one triggered TDP-R to be carried out, the service program with the highest priority is initiated and a request is sent to it (stage 420). The handling of the call is stopped until instructions are received from this service program at stage 422. Again, the instructions are evaluated as to whether they direct that the call proceed to some other place or require the call to be released (stage 424). In all such cases, the handling of the call at the detection point is ended and the remaining TDP-Rs are not handled. In all other cases the TDP-R execution is continued from stage 418 in the order according to the invention.

Figure 5A:
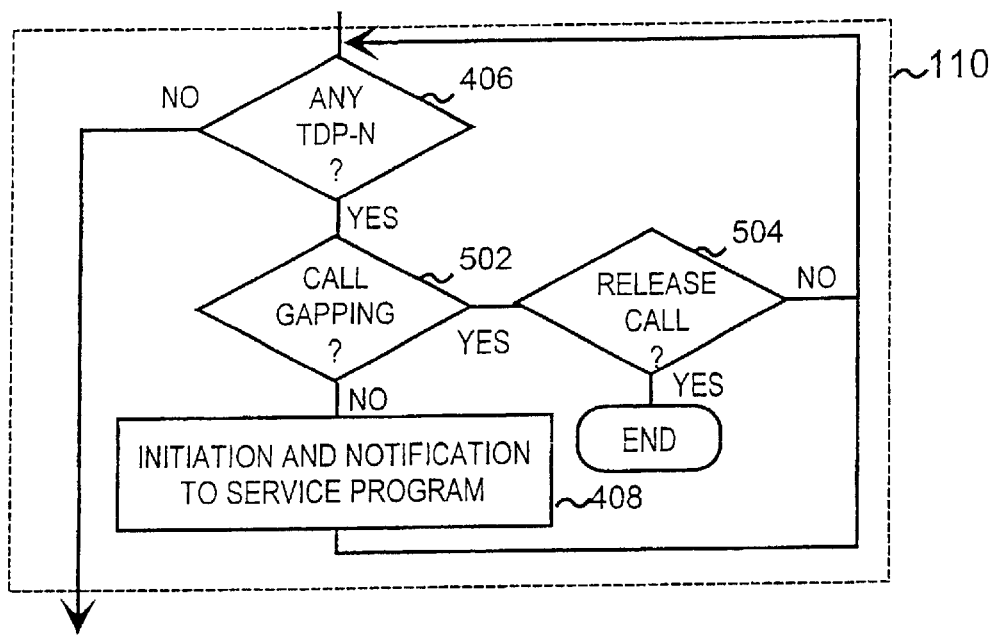
FIG. 5a shows one part in the second embodiment according to the invention.
Figure 5B:
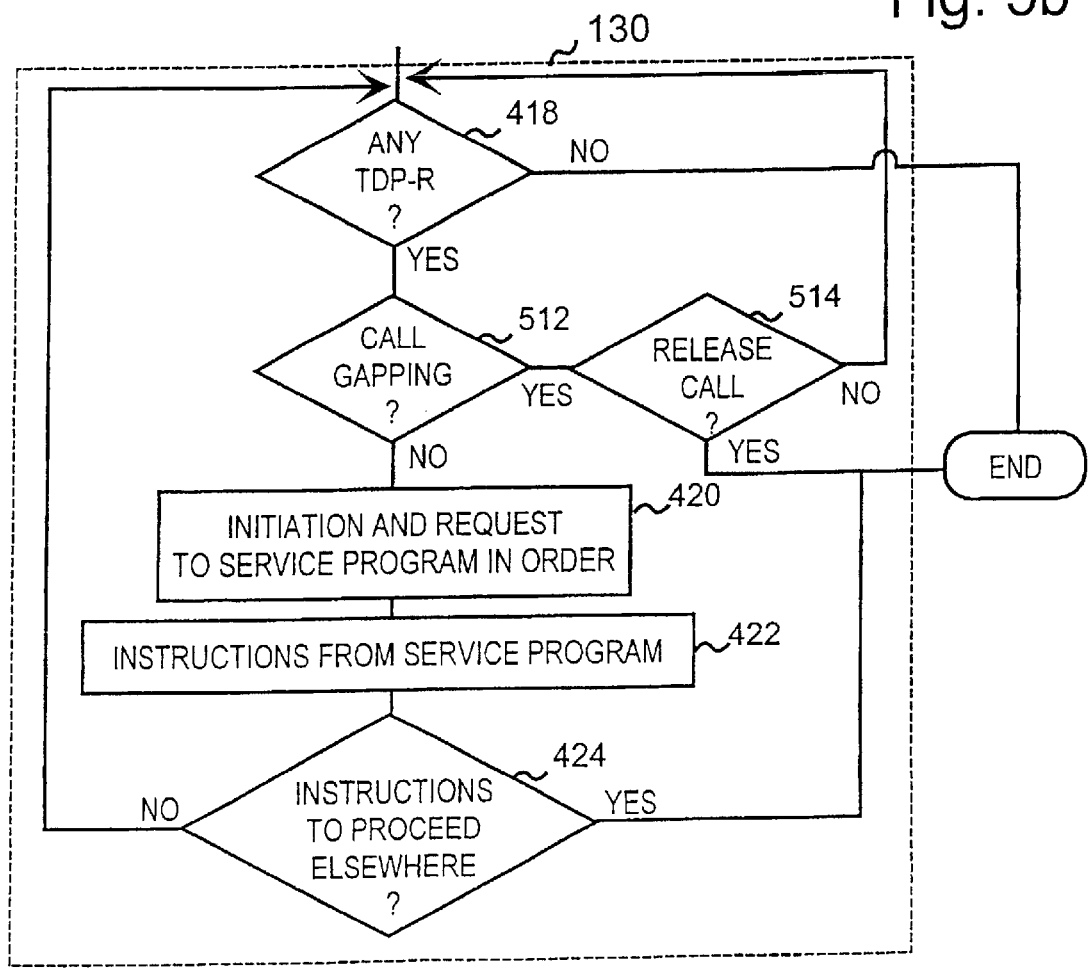
FIG. 5b shows another part in the second embodiment according to the invention.

FIGS. 5a and 5b show parts of the second embodiment according to the invention. Stages corresponding to those in FIG. 4 have the same numbers in FIGS. 5a and 5b. The parts of the method not shown in FIGS. 5a and 5b, i.e. the execution of EDP-N and EDP-R, correspond to those parts in the first embodiment. FIG. 5a presents the TDP-N execution 110 of this embodiment. At stage 406 the TDP-N contacts are checked as described above in connection with the first embodiment of the invention. If there is at least one triggered TDP-N to be carried out, the call gapping in the network is checked (stage 502). This check is useful for some IN-protocols, such as CS-1 and CS-2, as it aims to avoid overloading the SCP. When the check is passed, i.e. when the SCP is not deemed overloaded, the TDP-N execution is continued at stage 408 as described above. When call gapping is not passed, a check is made at stage 504 as to whether the call is to be released in this situation. If not, the TDP-N execution is continued from stage 406. When call gapping prevents the initiation of the service program, an announcement defined by this function can be given to the subscriber.

FIG. 5b presents the TDP-R execution 130 of this second embodiment. At stage 418 the TDP-R contacts are checked as described above in connection with the first embodiment of the invention. If there is at least one triggered TDP-R to be carried out, the call gapping in the network is checked (stage 512). When the check is passed, i.e. when the SCP is not deemed overloaded, the TDP-R execution is continued at stage 420 in the order according to the invention as described above. When call gapping is not passed, a check is made at stage 514 as to whether the call is to be released in this situation. If not, the TDP-R execution is continued from stage 418. An announcement about call gapping can be given to the subscriber.

In the third embodiment of the invention, the priority of the service programs is based on the controllability class allocated to them. In this embodiment, a controllability class is allocated to service programs as in FIG. 3 where the controllability class C1 is allocated to the service program SLP1, C2 to SLP2, and C3 to SLP3. According to the invention the allocated controllability class is utilized at the encounter of EDP-R and/or TDP-R. Thus, different controllability classes are mapped to indicate different priorities, and the service programs are initiated in the order of priority. For example, if C1 is mapped with the highest priority, C2 with the next highest priority, and C3 with the lowest priority, the execution order of these service programs would be: SLP1, SLP2, and SLP3, whenever they are contacted within the category of service-related detection points, i.e. EDP-R or TDP-R. In addition a check is made at the encounter of a TDP-R as to whether the initiation of a service program with an allocated controllability class is to be allowed, i.e. whether the controllability class in question is not already in use by another service program. If the initiation is allowed, the service program is initiated and instructions are waited for as above. Otherwise, the service program is abandoned, and execution of the TDP-R is continued with another TDP-R. On receiving instructions, the SSP checks if they are within the controllability class of that service program. If not, the instructions are ignored and execution of the EDP-R or TDP-R is continued with the next service program. Otherwise, the instructions are checked as described above in connection with the first embodiment.

When according to the invention a service program can not be initiated or the SCP contact fails, execution can be continued with the next service program, the detection point can be abandoned, or the call may need to be released. The operation in such cases can be defined in the IN-service information, for example.

The execution order according to the invention is especially advantageous when at least some of the service programs must be initiated in a specific order. Often a combination of services provides a different result depending on the execution order of the services. Sometimes it is not even possible to initiate a service program in an early stage of the call. An example of a combination is an accessibility service and some location dependent service, whereby the accessibility service needs to be executed first and thus needs to have higher priority than the location dependent service.

The invention is also suited for use with a service implemented according to several different protocols. According to the invention one of the service programs is then initiated first as it has been given the highest priority. After that the other versions of the same service can be abandoned with the aid of a controllability class already allocated, for example. The priority of the service programs can also depend on the subscriber's location. An example of such functionality is a service with CS-2 protocol having high priority in the home network and the same service with CAMEL (Customized Applications for Mobile Enhanced Logic) protocol having high priority in visited networks.

The drawings and the explanations relating to them are only intended to illustrate the inventive idea. The method in accordance with the invention may vary as regards its details within the scope defined by the claims. Although the invention was described above mainly in terms of specific categories of service-related detection points, the method may also be used with other divisions of service-related detection points. The service programs described above can be switch-based services, IN-services, or services similar to IN-services but having interface other than IN-interface between the controlling program packet and the controlled switching unit, e.g. a special number portability database or a calling name database. The invention is also applicable when using different protocols, such as CorelNAP or CAMEL, even in the same BCSM when contacting control points. In the method according to the invention, information to be relayed may also be transferred in connection with other operations than those presented above and at other times than at detection points, e.g. in connection with state-of-the-art spontaneous messages, such as ReleaseCall or Cancel.

What is claimed is:

1. A method of controlling service execution in an intelligent network, including at least one switching point and several service programs, in which method in connection with a call at least two control relationships are formed between the switching point and service programs which supply it with instructions and at least one special point is arranged in the call whereby contact is made between the switching point and at least two service programs, the method comprising:

the execution order of different service programs is defined independently of the triggering order of the service programs; and at a special point of the call, the service programs are contacted by the switching point in the execution order till the call is instructed to leave the special point of the call.

2. The method according to claim 1, wherein at a special point of the call a category of service-related detection points is determined based on the relationship type and the activation mode of the service programs, wherein a priority level is attached to service programs with a control relationship and the execution order within each category with a control relationship is determined based on this priority level.

3. The method according to claim 2, wherein the priority level is defined with a priority parameter.

4. The method according to claim 2, wherein a controllability class is allocated to a service program, a priority for each service program with control relationship is defined by the controllability class, and the execution order within each category with control relationship is determined based on this priority.

5. The method according to claim 2, wherein the execution order is defined within the category of already activated service programs with a control relationship.

6. The method according to claim 2, wherein the execution order is defined within the category of not yet activated service programs with a control relationship.

7. The method according to claim 4, wherein a new service program may only be activated when its controllability class differs from the controllability classes of the service programs already activated.

8. The method according to claim 6, wherein call gapping is checked before initiating a new service program and the service program is initiated whenever the check is passed.

9. The method according to claim 6, wherein a service triggering criteria are checked before initiating a new service program and the service program is initiated whenever the check is passed.

10. The method according to claim 1, wherein the special point of the call is a detection point of a basic call state model.

11. A switching point in an intelligent network, in which network in connection with a call at least two control relationships are formed between the switching point and service programs which supply it with instructions and at least one special point is arranged in the call whereby contact is made between the switching point and at least two service programs, the switching point comprising:

at a special point of the call, the switching point is adapted to contact the service programs in the execution order defined for the different service programs independently of the triggering order of the service programs till the call is instructed to leave the special point of the call.

* * * * *